(12) United States Patent
Xiang

(10) Patent No.: US 10,747,926 B2
(45) Date of Patent: *Aug. 18, 2020

(54) LOW-POWER TEST COMPRESSION FOR LAUNCH-ON-CAPTURE TRANSITION FAULT TESTING

(71) Applicant: TSINGHUA UNIVERSITY, Beijing (CN)

(72) Inventor: Dong Xiang, Beijing (CN)

(73) Assignee: Tsinghua University, Beijing (CN)

( * ) Notice: Subject to any disclaimer, the term of this patent is extended or adjusted under 35 U.S.C. 154(b) by 54 days.

This patent is subject to a terminal disclaimer.

(21) Appl. No.: 15/972,599

(22) Filed: May 7, 2018

(65) Prior Publication Data

US 2019/0018910 A1   Jan. 17, 2019

(30) Foreign Application Priority Data

Jul. 12, 2017   (CN) .......................... 2017 1 0567584

(51) Int. Cl.
*G06F 30/3323*   (2020.01)
*G01R 31/317*   (2006.01)
(Continued)

(52) U.S. Cl.
CPC ... *G06F 30/3323* (2020.01); *G01R 31/31704* (2013.01); *G06F 30/327* (2020.01);
(Continued)

(58) Field of Classification Search
CPC .... G06F 11/27; G06F 17/504; G06F 17/5059; G06F 17/505; G06F 2217/14;
(Continued)

(56) References Cited

U.S. PATENT DOCUMENTS 4,602,210 A * 7/1986 Fasang ........... G01R 31/318572
714/731
7,137,053 B2 * 11/2006 Khoche .......... G01R 31/318555
714/726
(Continued)

OTHER PUBLICATIONS

Mrugalski et al.; "New Test Data Decompressor for Low Power Applications"; 2007 44th ACM/IEEE Design Automation Conference (Year: 2007).*
(Continued)

*Primary Examiner* — Helen Rossoshek
(74) *Attorney, Agent, or Firm* — Levine Bagade Han LLP

(57) ABSTRACT

A new low-power test compression method and design for testability (DFT) architecture are proposed for deterministic test pairs for launch-on-capture (LOC) transition fault testing by using a new seed encoding scheme, a new low-power test application procedure and a new test compression architecture. The new seed encoding scheme generates seeds for all test pairs by selecting a primitive polynomial that encodes all test pairs of a compact test set. The low-power test compression architecture includes: (1) the LFSR established by the selected primitive polynomial and the selected number of extra variables injected to the LFSR; (2) the scan tree architecture for LOC transition fault testing; and (3) the new gating technique. A new static test compaction scheme is proposed by bitwise modifying the values of a seed and the extra variables. A new technique for test point insertion is proposed for LOC delay testing in the two-frame-circuit model, which apparently reduces test data volume.

1 Claim, 5 Drawing Sheets

(51) Int. Cl.
*G06F 30/35* (2020.01)
*G06F 30/327* (2020.01)
G06F 30/333 (2020.01)
G06F 30/396 (2020.01)
G06F 119/12 (2020.01)

(52) U.S. Cl.
CPC ............ *G06F 30/35* (2020.01); *G06F 30/333* (2020.01); *G06F 30/396* (2020.01); *G06F 2119/12* (2020.01)

(58) Field of Classification Search
CPC ............ G06F 2217/62; G06F 2217/84; G06F 30/3323; G06F 30/30; G06F 30/327; G06F 30/33; G06F 30/35; G06F 30/396; G06F 30/3308; G06F 30/333; G01R 31/317; G01R 31/31704; G01R 31/31724; G01R 31/3187; H01L 25/50; H01L 1/189
See application file for complete search history.

(56) References Cited

U.S. PATENT DOCUMENTS

| | | | |
|---|---|---|---|
| 7,779,381 B2 * | 8/2010 | Chickermane ... | G01R 31/31721 703/14 |
| 7,962,820 B2 * | 6/2011 | Rajski ............ | G01R 31/318547 714/726 |
| 8,290,738 B2 * | 10/2012 | Lin ................ | G01R 31/318575 702/124 |
| 8,499,209 B2 * | 7/2013 | Rajski ............ | G01R 31/318575 714/741 |
| 8,832,512 B2 * | 9/2014 | Czysz ................... | G06F 11/079 714/738 |
| 9,377,508 B2 * | 6/2016 | Rajski ............ | G01R 31/318547 |
| 9,984,962 B2 * | 5/2018 | Ogras ................ | H01L 23/5387 |
| 10,338,138 B2 * | 7/2019 | Sul ................ | G01R 31/318364 |
| 2009/0150112 A1 * | 6/2009 | Parulkar ........ | G01R 31/318558 702/118 |
| 2015/0253385 A1 * | 9/2015 | Rajski ............ | G01R 31/318342 714/738 |
| 2017/0193154 A1 * | 7/2017 | Sul ................ | G01R 31/318314 |
| 2019/0293718 A1 * | 9/2019 | Milewski ......... | G01R 31/31835 |

OTHER PUBLICATIONS

Czysz et al.; "Low-Power Test Data Application in EDT Environment Through Decompressor Freeze"; vol. 27, Issue: 7; Journal Article; Publisher: IEEE I (Year: 2008).*

Czysz et al.; "Low Power Compression of Incompatible Test Cubes"; 2010 IEEE International Test Conference; Publisher: IEEE ( Year: 2010).*

Stanis et al.; "Reordering and Test Pattern Generation for Reducing Launch and Capture Power"; 2015 International Conference on Innovations in Information, Embedded and Communication Systems (ICIIECS); Publisher: IEEE (Year: 2015).*

Wang et al.; "Deviation-Based LFSR Reseeding for Test-Data Compression"; ; IEEE Transactions on Computer-Aided Design of Integrated Circuits and Systems; vol. 28; Issue: 2; Publisher: IEEE) (Year: 2009).*

* cited by examiner

LOW-POWER TEST COMPRESSION FOR LAUNCH-ON-CAPTURE TRANSITION FAULT TESTING

CROSS-REFERENCE TO RELATED APPLICATION

This application claims priority to and the benefit of Chinese Patent Application No. 201710567584.4 filed in the Chinese Patent Office on Jul. 12, 2017, the entire contents of which is incorporated herein by reference.

TECHNICAL FIELD

The present invention relates to test technique of integrated circuit and more particularly to the design for testability architecture to implement low power test compression for LOC delay testing.

BACKGROUND

TABLE 1

ATPG results for single stuck-at faults and LOC delay testing

| circuits | details of the circuits | | | | stuck-at tests | | | | transition test | | | |
| --- | --- | --- | --- | --- | --- | --- | --- | --- | --- | --- | --- | --- |
| | PIs | POs | FFs | gates | vec | FC | MAX | CPU(s) | vec | FC | MAX | CPU(s) |
| b19 | 24 | 30 | 6,642 | 225,800 | 1546 | 98.80 | 3659 | 3560 | 9652 | 84.47 | 4053 | 11246 |
| ethernet | 94 | 115 | 13,715 | 105,371 | 906 | 99.20 | 1931 | 1480 | 3501 | 99.39 | 2159 | 7616 |
| vga_lcd | 87 | 109 | 17,079 | 153,664 | 980 | 99.40 | 5884 | 2940 | 9045 | 99.64 | 6032 | 14110 |
| netcard | 15 | 646 | 97,796 | 568,986 | 2260 | 99.10 | 7371 | 4680 | 27810 | 97.52 | 9609 | 35220 |

Test data volume for LOC transition fault testing is far more than that of single stuck-at testing. Table I presents test generation results for LOC transition fault testing and single stuck-at fault testing. The columns with vec, FC and MAX represent the number of tests, fault coverage, and the number of maximum care bits for the whole test set, respectively. It is found that the number of test vectors for LOC transition fault testing is far more. The maximum number of care bits for single stuck-at tests is also apparently less than that for LOC transition fault testing. It is important for us to present an effective method for LOC transition fault test compression. Scan chain designs are used for both single stuck-at fault testing and LOC transition fault testing.

The current commercial EDA tools cannot handle test compression for LOC delay testing well. Excessive test power dissipation of test power has been a severe problem, which is even more difficult to handle for LOC delay testing. The huge amount of test data for delay testing makes test compression for delay testing even more important than that for stuck-at fault testing. Test application of compressed test data produces further more test power. Therefore, there is a strong need for an effective low-power test compression approach.

In this invention, we propose a new low-power test compression architecture for LOC-based transition fault testing. We present the major contributions of this invention as follows: (1) the LFSR established by the selected primitive polynomial and the selected number of extra variables injected to the LFSR; (2) the scan tree architecture for LOC transition fault testing; and (3) the new gating technique. (4) A new static test compaction scheme is proposed by bitwise modifying the values of a seed and the extra variables. (5) A new technique for test point insertion is proposed for LOC delay testing in the two-frame-circuit model, which apparently reduces test data volume.

Most of the previous deterministic BIST approaches did not include low-power concerns. We intend to present a new method that effectively combines an efficient low-power test application scheme for LOC delay testing. Power consumption for delay testing is an even more difficult problem because of a much larger number of delay test patterns. We propose a low-power test compression approach for LOC transition fault testing by using new a DFT architecture, test application scheme, seed modification and test point insertion technique.

As for the DFT architecture, our method introduces a new primitive polynomial selection method, and a new scheme to select the number of extra variables. Using the proposed DFT architecture, all deterministic test pairs can be encoded into a seed with a sequence of extra variables injected into the LFSR.

Test point are inserted into the circuit by reducing the potential care bits for each deterministic test pairs. This is implemented by using a cost function for LOC transition fault testing. Extra pins of the control points are connected to the PPIs or PIs in the two-frame circuit model by circuit structural analysis.

In order to further reduce test data volume, we propose a new seed modification technique. The seed modification technique can remove some seeds by revising the calculated values of the extra variables and the seed for each test pair. The seed modification technique is implemented by complementing value of each bit for the seed and extra variables, which removes some seeds and reduces test data volume without any additional control data. A new test point insertion placement scheme is proposed to compress test data volume based on the influence-cone based testability measure for LOC transition fault testing. Test point insertion is to reduce the number of care bits to detect faults. The extra pin of a control test point is connected to a pseudo-primary input (PPI). Extra pins of multiple control test points can share the same PPI. The pin overhead can be well-controlled based on the above scheme.

SUMMARY

1. The Design for Testability Architecture

A new DFT architecture is presented in FIG. 1 to implement the low-power test compression method for LOC transition fault testing using a new deterministic built-in self-test scheme.

The DFT architecture includes: (1) the LFSR established by the selected primitive polynomial and the selected number of extra variables injected to the LFSR; (2) the scan tree architecture for LOC transition fault testing; and (3) the new gating technique. The invention selects a primitive polynomial with the minimum degree and the smallest number of extra variables, which encodes all deterministic tests.

Each demultiplexer drives the same number of scan trees, where each scan tree is driven by a separate clock signal. The signal $R'_1$ drives all the first scan trees from all demultiplexers, the signal $R'_2$ drives all the second scan trees from all demultiplexers, ..., and $R'_k$ drives all the kth scan trees from all demultiplexers. Increasing the fanout factor of the demultiplexers does not increase test application cost because the depth of the scan trees decreases.

Each stage of the PS drives multiple scan trees as shown in FIG. 1, which can also significantly reduce the size of the PS compared with the multiple scan-chain architecture. Each stage of the PS in multiple scan-chain design drives a single scan chain. If the fanout factor of the demultiplexers is 16, and the group size for the scan trees is 10. Each scan-in pin drives 160 scan chains. The compactor connected to the combinational part CUT of the circuit is to reduce the size of the MISR.

2. The Scan Trees and Response Compaction for LOC Transition Fault Testing

The scan trees are constructed by circuit structural analysis. Each output of a demultiplexer drives a scan tree, where all scan flip-flops at the same level of a scan tree do not have any common combinational successor in the two-frame circuit. More scan chains are connected to the same XOR to compact test responses if the scan flip-flops at the same level of the scan chains do not have any common predecessor in the two-frame circuit.

3. Selection of the Primitive Polynomial and the Minimum Number of Extra Variables The size of the LFSR and the number of extra variables injected into the LFSR determine the data volume of a test pair. A primitive polynomial, with the minimum number of extra variables, is selected. The LFSR established by the selected primitive polynomial and injected extra variables can encode all deterministic test pairs based on a compact test generator.

Our method selects a primitive polynomial whose degree i is no less than 20. The LFSR with no extra variables is considered first. If the LFSR-based test generator cannot encode all deterministic test pairs after all primitive polynomials of degree i have been tried, we consider the case when a single extra variable is injected. If all deterministic test pairs still cannot be encoded, our method considers the case when two extra variables are injected. This process continues until the given number of extra variables $L_2$ (it is set to 4 in all experimental results) and all primitive polynomials have been considered. If the LFSR-based test generator still cannot encode all deterministic test pairs, we consider the primitive polynomials of degree i+1. If all other primitive polynomials of degree i+1 have been checked, and our method still cannot find a proper primitive polynomial, we check primitive polynomials of degree i+2. This process continues until we find a primitive polynomial that can encode all deterministic test pairs. An LFSR with small size is enough to encode all deterministic test pairs in all cases.

A small number of extra pins are required to control the demultiplexers (DMUX) as shown in FIG. 4 in order to implement the gating technique for low-power BIST, where all DMUXs in FIG. 4 can share the same extra pins. The extra pins of all demultiplexers can be connected to an extra register to reduce the pin overhead.

4. The New Test Point Architecture for LOC Delay Testing

We propose a new test point architecture and a new test point insertion approach for LOC delay testing. In all cases, the control input of a control point is connected to an PPI. The new test point architecture in this invention is presented as shown in FIG. 2:

(1) FIGS. 2(a) and 2(b) present the 0-control test points, one is constructed using an OR gate in FIG. 2(a) and the other an AND gate as the switching gate. Both switching gates are connected to the AND gate. The test mode link is connected to the AND switching gate in FIG. 2(b), and it is connected to an inverter first and the output of the inverter is connected to the other input of the switching OR gate as shown in FIG. 2(a).

(2) FIGS. 2(c) and 2(d) present the 1-control test points, one is constructed using an AND gate in FIG. 2(c) and the other an OR gate as the switching gate. Both switching gates are connected to the OR gate. The test mode link is connected to the AND switching gate in FIG. 2(c), and it is connected to an inverter first and the output of the inverter is connected to the other input of the switching OR gate as shown in FIG. 2(d).

Timing-driven test point insertion places control test points away from the critical paths and reduce test data volume. The influence input measure indicates the subset of inputs that must be specified in order to generate a test pair to detect a transition fault. The influence input measure indicates the number of PIs or PPIs should be specified in order to detect a transition fault under the LOC testing mode. Our method uses the following gain function to select test points, $$G = \sum_{t \in F} \Delta |det(t)| \qquad (1)$$

where F is the 20% hard-to-detect transition faults among all uncovered ones, t can be a falling or rising transition. Assume that a line l in the first frame, the corresponding line is l' in the second frame of the two-frame circuit model. The detectability of a rising and falling transition at a single line is defined as the number of inputs must be specified to detect the transition fault in the two-frame circuit, $$\Delta |det(l/r)| = \Delta |C0(l) \cup C1(l') \cup O(l')|, \qquad (2)$$

$$\Delta |det(l/f)| = \Delta |C1(l) \cup C0(l') \cup O(l')|. \qquad (3)$$

where C1(l), C0(l), and O(l) represent the subsets of PIs or PPIs in the first frame of the two-frame circuit model that must be specified in order to control value 1, 0. Our method inserts three different types of test points, 1-control, 0-control, and observation points.

Our method selects the 20% most hard-to-detect faults as the candidates to insert test points. 1-control or 0-control test points are tried to insert into all candidates. Our method selectively updates controllability measures of all nodes with changed measures using a selective tracing scheme. The location and type of control point is determined, which introduces the most detectability changes. Continue the above process until all test points have been inserted. All control points and observation points are inserted into both frames of the two-frame circuit when updating the input influence measures.

This invention estimates observability measure changes of the corresponding nodes. All observation points are connected to the response compactors by considering the observation points like scan flip-flops. Two observation points can be connected to the same XOR gate if they do not have any common predecessor in the two-frame circuit.

Assume that O1, O2, ..., Ok are inserted into observation points, they can be connected to the same XOR tree with a single output if any pair of O1, O2, ..., Ok do not have any common predecessor in the two-frame circuit.

Extra pins must be well-controlled. The extra pins of the control points are connected to the PPIs in both frames of the two-frame circuit model. The extra pin of a control point can be connected to a PPI if the PPI and the node inserted into a control point do not have any common successor in the two-frame circuit. The two extra pins of two control points inserted into A and B can be connected to the same PPI in if any pair of A, B, and in do not have any common successor in the two-frame circuit.

As shown in FIG. 3(a), the extra pin of the test point at A (it is A' in the second frame) is connected to PPI I. It is required that I and A not have any common combinational successor in the two-frame circuit. As shown in FIG. 3(b), two test points inserted at A and B. Their extra pins are connected to the same PPI I. It is required that any pair of A, B, and I not have any common combinational successor in the two-frame circuit.

When we considering inserting a control test point to improve the test data compression rate, it is a little complex. A control point can be helpful to improve controllability of hard-to-detect faults because the first value of a falling or rising transition should be generated in the first frame of the circuit. A control point insertion can also improve controllability and observability of nodes in the second frame. In both cases, detectability of hard-to-detect faults can be improved. Therefore, we must attach the extra pin of a control point to a PPI. How to select a PPI to connect the extra pin of a control point? Our method selects one of the PPIs that is not converge with node A in the two-frame circuit, which have the best controllability improvement after the control point in first frame has been inserted.

Observability in only the second circuit frame is of interest to improve detectability of hard-to-detect transition faults. Observability improvement of nodes in the second frame of the circuit is considered. Observability improvement for nodes in the first frame does not have any impact on detectability of any fault for LOC testing. The new test point insertion scheme is to directly reduce the number of specified inputs for all hard-to-detect transition faults, which can have great impact on the pattern count of the compact ATPG tool.

5. Static Test Compaction by Bitwise Modifying the Encoded Seeds

A new static test compaction procedure, after all seeds have been produced, is proposed by bitwise modifying the seeds and the extra variables. The seeds are ordered according to summation of the number of seed bits and the number of extra variable bits. We consider the compact test set for LOC transition fault testing after dynamic and static test compaction have been completed.

Each test is encoded to a seed, whose size is at most the size of the LFSR, and a sequence of extra variables. Each seed s keeps a fault list Fs covered by the test. The proposed method orders all seeds according to the summation of the numbers of bits in the seed, and the total number of bits of the extra variables to encode the test.

A seed with the most bits is taken first, our method do fault simulation on the modified seed on each bit of the seed and the extra variables by complementing the bit. Our method remains the modification on the seed s if the modified seed covers all detected faults in Fs of the corresponding test, and detect at least one more fault covered by any seed later in the ordered seed sequence. Otherwise, our method recovers the seed back to the original. When complementing a bit of the seed or the extra variables of s makes the test pair detect any fault f covered by another test pair s' later in the ordered sequence, the fault f is moved to the detected fault list Fs of seed s. This fault is also removed from the detected fault list $F_{s'}$ of seed s'. When the detected fault list $F_{s'}$ of s' becomes empty, s' is deleted from the test set.

BRIEF DESCRIPTION OF THE DRAWINGS

FIGS. 2(a) and 2(b) 0-control point, FIGS. 2(c) and 2(d) 1-control point.

FIG. 3(a) connecting the extra pin to a PPI, FIG. 3(b) two extra pins share the same PPI.

DETAILED DESCRIPTION

Figure 1:
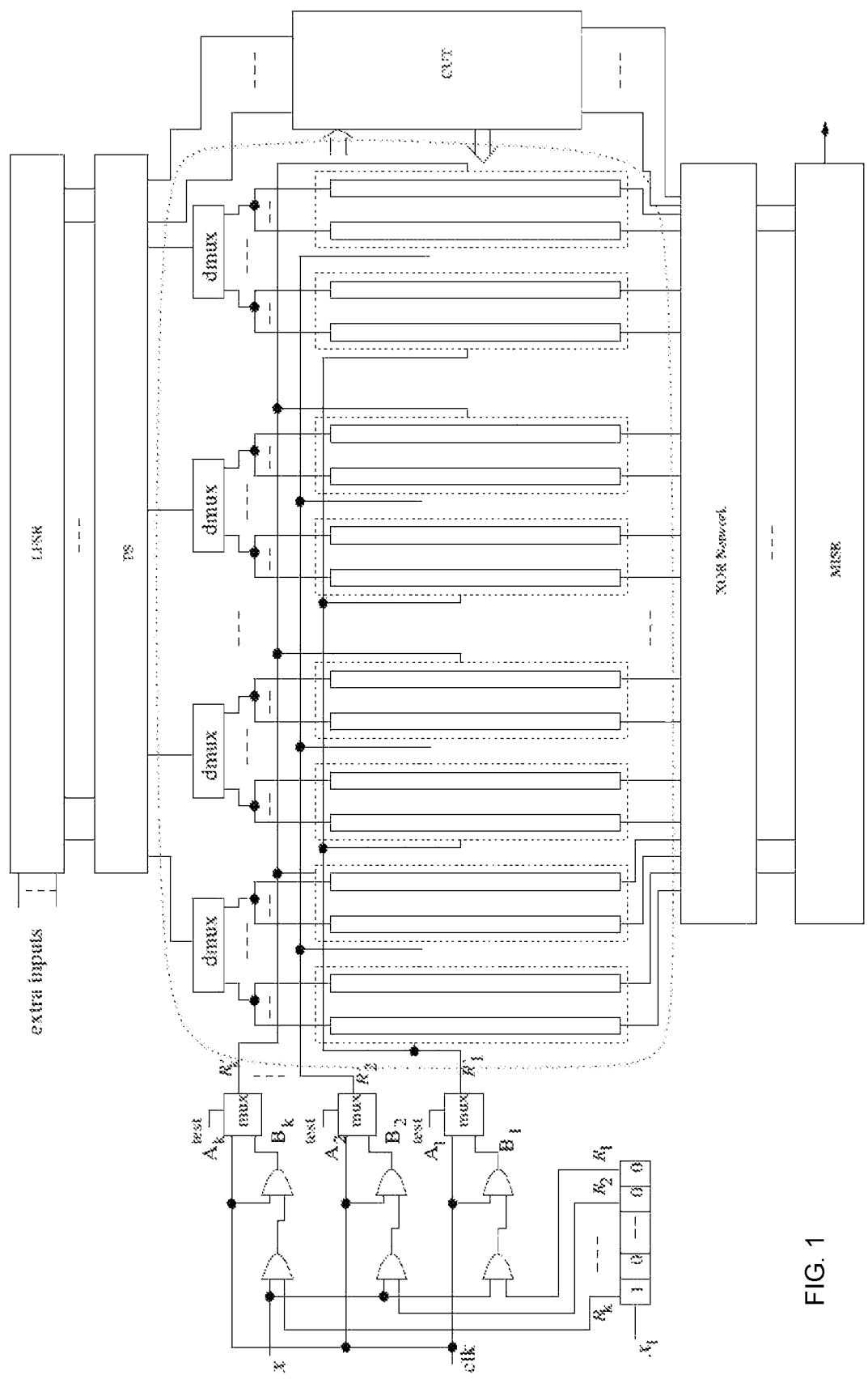
FIG. 1 is the general DFT architecture of low-power test compression for LOC transition fault testing.

1. The Design for Testability Architecture to Implement Low-Power Test Compression for LOC Delay Testing Test data volume for LOC transition fault testing is far more than that of single stuck-at testing. Table I presents test generation results for LOC transition fault testing and single stuck-at fault testing. The columns with vec, FC and MAX represent the number of tests, fault coverage, and the number of maximum care bits for the whole test set, respectively. It is found that the number of test vectors for LOC transition fault testing is far more. The maximum number of care bits for single stuck-at tests is also apparently less than that for LOC transition fault testing. It is important for us to present an effective method for LOC transition fault test compression.

We cannot directly use test compression tools or methods for stuck-at tests to compress test data for LOC delay fault testing because test compression for LOC delay testing is quite different. They are different in the following aspects: (1) stimulus test data for LOC delay testing are generated in the two-frame circuit, while stuck-at tests are generated in the one-frame circuit. Therefore, the correlation between each pair of scan flip-flops is quite different. (2) Test response data compaction should also be different. Response data for any pair of scan flip-flops are also extended to the two-frame circuit; however, test response data of two scan flip-flops for single stuck-at fault testing is considered in the one-frame circuit, that is, the combinational part of the circuit.

There is a sufficient condition to merge two scan flip-flops $f_1$ and $f_2$ into a single for LOC transition fault testing if $f_1$ and $f_2$ do not have any common combinational successor in the two-frame circuit. Two scan flip-flops $f_1$ and $f_2$ can be included into the same scan flip-flop group for single stuck-at fault testing if $f_1$ and $f_2$ do not have any common combinational successor in the combinational part of the circuit.

We can also provide a sufficient condition for test response compaction and test compression. Test stimulus for two scan flip-flops can be compressed into a single bit for single stuck-at tests if they do not have any common combinational successor in the combinational part of the circuit. Test responses for two scan flip-flops can be compacted into a single bit for single stuck-at tests if they do not have any common combinational predecessor in the combinational part of the circuit. Test stimulus for two scan flip-flops can be compressed into a single bit for LOC transition fault tests if they do not have any common combinational successor in the two-frame circuit. Test responses for two scan flip-flops can be compacted into a single bit for LOC transition fault tests if they do not have any common combinational predecessor in the combinational part of the circuit.

As stated above, both test compression and test compaction for single stuck-at tests and LOC transition fault tests are quite different. Therefore, we should use different scan architectures and test response compactors. A new DFT architecture is presented in FIG. 4 to implement the low-power test compression method for LOC transition fault testing using a new deterministic built-in self-test scheme.

Figure 4:
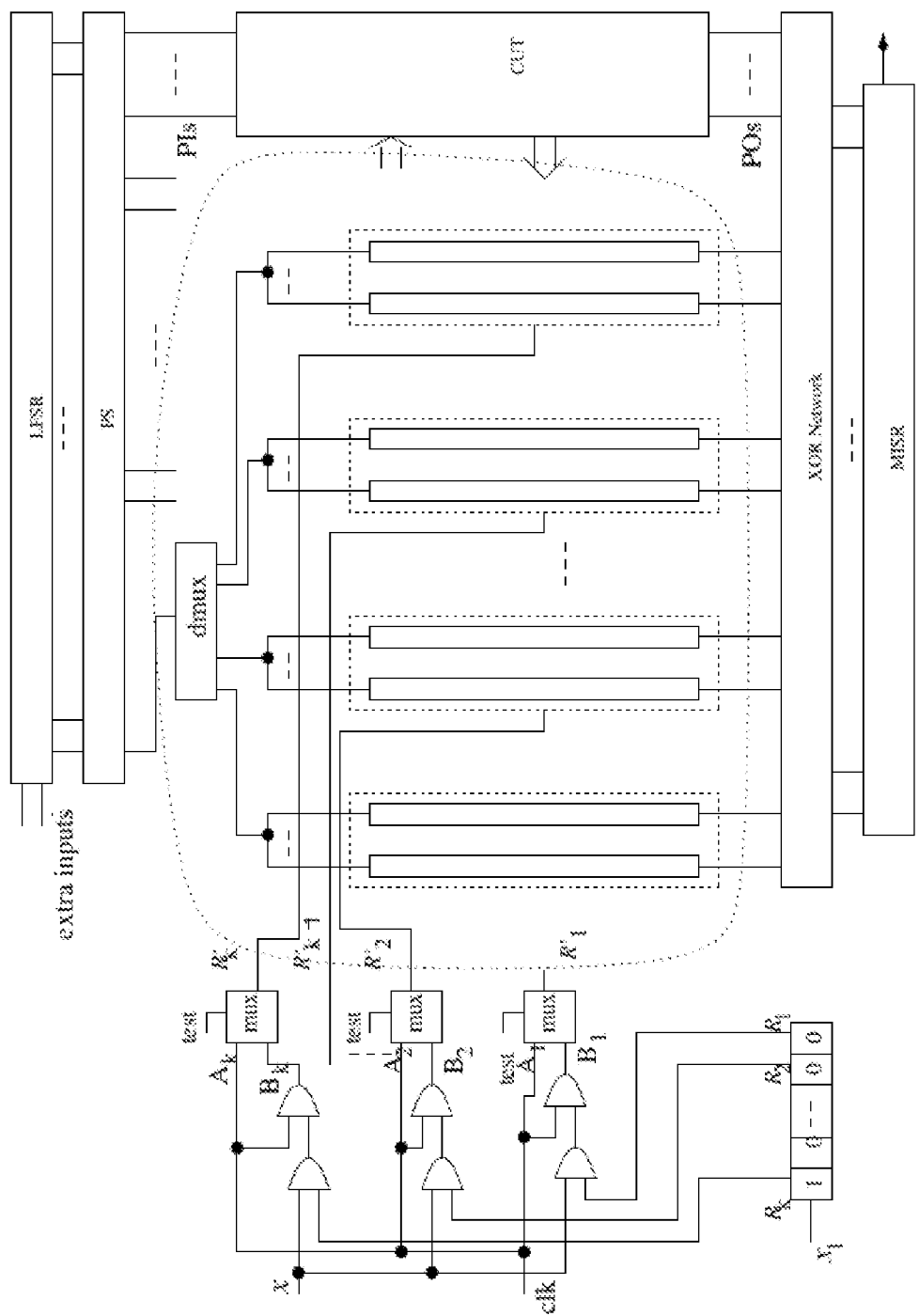
FIG. 4 is the general DFT architecture of low-power test compression for LOC transition fault testing

Each stage of the PS drives multiple scan trees as shown in FIG. 4, which can also significantly reduce the size of the PS compared with the multiple scan-chain architecture. Each stage of the PS in multiple scan-chain design drives a single scan chain. If the fanout factor of the demultiplexers is 16, and the group size for the scan trees is 10. Each scan-in pin drives 160 scan chains. This can also effectively improve the efficiency of test response compaction. The compactor connected to the combinational part CUT of the circuit is to reduce the size of the MISR.

The size of the LFSR can be very large if it is set according to the number of maximum care bits because a few vectors can have a large number of care bits. This may significantly increase the test data volume in order to keep the seeds with big numbers of care bits.

There is still enough room to reduce the total number of care bits of all test pairs generated for the scan-chain based designs. Scan tree architecture can significantly reduce the total number of care bits and the maximum number of care bits of the test pairs. It is found that the maximum number of care bits can be reduced tens of times for single stuck-at tests using the scan-tree architecture compared to the scan-chain designs.

The size of the LFSR can be determined as follows. A primitive polynomial, with a number of extra variables, is selected. The LFSR established by the selected primitive polynomial and injected extra variables can encode all deterministic test pairs based on a compact test generator. Test sets generated by any other test generators can also be used based on the proposed seed encoding scheme.

A small number of extra pins are required to control the demultiplexers (DMUX) as shown in FIG. 4 in order to implement the gating technique for low-power BIST, where all DMUXs in FIG. 4 can share the same extra pins. The extra pins of all demultiplexers can be connected to an extra register to reduce the pin overhead. As shown in FIG. 4, all scan chains in the same scan tree are selected into the same subset of scan chains, which are driven by the same clock signal.

We first propose a new scheme to select a proper primitive polynomial with the injected extra variables for the LFSR that encodes all deterministic test pairs. The area overhead can be trivial because the size of the PS can also be very small, where each stage of the PS drives a couple of scan trees based on the proposed gating technique, instead of a single scan chain.

Some extra variables are injected just like EDT. We propose a new procedure to select the size of the LFSR, the primitive polynomial that establishes the LFSR and the number of extra variables simultaneously in order to minimize the amount of deterministic test data.

The selected primitive polynomial establishes an LFSR that encodes all deterministic test pairs with the selected number of extra variables. The tool that we used to generate primitive polynomials can only handle polynomials up to degree 128 of the word-length limit of the computer. However, only very small LFSRs are used for all circuits according to all experimental results (no more than 30). This is mainly because we inject some extra variables to the LFSR. To encode the deterministic test pairs with a large number of care bits, the injected extra variables and the seed kept in the LFSR are combined.

Some deterministic test patterns cannot be encoded by the established LFSR although the situation does not occur for the circuits that we used up to now. A new procedure is proposed to select a primitive polynomial with the minimum degree that can encode all deterministic test pairs for LOC delay testing. Usually, the numbers of care bits of all deterministic test pairs are quite different. The new procedure selects a primitive polynomial of relatively low degree according to the new low-power test application scheme when some extra variables are injected into the LFSR.

This invention selects a primitive polynomial whose degree is no less than 20. The LFSR with no extra variables is considered first. If the LFSR-based test generator cannot encode all deterministic test pairs, our invention considers the second primitive polynomial with the same degree. This process continues until all primitive polynomials have been considered. If the LFSR still cannot encode all tests, we consider the case when a single extra variable is injected. If all deterministic test pairs still cannot be encoded, our method considers the case when two extra variables are injected. This process continues until the given number of extra variables $L_2$ have been considered ($L_2$ is set to 4 for our experiments). If the LFSR-based test generator still cannot encode all deterministic test pairs, we consider the primitive polynomials of degree i+1. Similarly, if all other primitive polynomials of degree i+1 have been checked, and our method still cannot find a proper primitive polynomial, we check each of the i+1-degree primitive polynomials with at least one extra variable injected. This process continues until we find a primitive polynomial with the minimum number of extra variables injected into the LFSR that can encode all deterministic test pairs. Otherwise, the degree of the primitive polynomials has been greater than a given threshold, return no primitive polynomial can be selected.

The new procedure for primitive polynomial selection and determination of the number of extra variables are presented to establish the LFSR and the number of extra variables inserted into the LFSR. The detailed scheme to select a primitive polynomial and the number of extra variables injected into the LFSR is presented as follows. Our method starts with degree 20 primitive polynomials. First, the number of extra variables v is set to zero. Our method checks whether any of the polynomial encodes all deterministic test pairs. If not, our invention checks the next i-degree primitive polynomial. This process continues until all primitive polynomials have been checked.

Our invention checks whether a primitive polynomial with v extra variables injected works when v is set to 1. This process continues until the number of extra variables has been greater than a given threshold. If there is still no primitive polynomial selected, this invention considers 21 degree primitive polynomials. This process continues until a primitive polynomial and the minimum number of extra variables, that encode all deterministic test pairs, have been selected.

A well-designed LFSR is needed in order to encode all deterministic pairs. A new procedure is proposed to select a primitive polynomial with the minimum degree that can encode all deterministic test pairs for the hard faults. An efficient scheme is used to generate primitive polynomials of any desired degree. For any i≤30, assume that all primitive polynomials are kept in the $Q_i$. As for i>30, only a limited number of primitive polynomials are provided in $Q_i$. The following procedure returns a primitive polynomial with the minimum degree that encodes all deterministic pairs.

Usually, the numbers of care bits of all deterministic test pairs are quite different. Therefore, it is recommended to use an LFSR, whose size is more than the maximum number of care bits $S_{max}$ of all deterministic test pairs. The new procedure selects a primitive polynomial of relatively low degree when some extra variables are injected into the LFSR. The commercial tool EDT used similar technique to reduce the amount of test data stored in the on-chip ROM or ATE.

The fanout factor of the demultiplexers can have significant impact on the test data compression rate. Experimental results presented in the rest of the invention confirm this. Therefore, we set the fanout factor of the demultiplexers a larger number for the deterministic test compression.

The proposed DFT architecture as shown in FIG. 4 has an implicit advantage over other BIST architectures. Each stage of the PS drives the input of demultiplexer, each of whose outputs drives a scan tree instead of a single scan chain. Each stage of the PS requires a few number of XOR gates. In any case, flip-flops of all disabled scan chains are assigned with specified values. Therefore, no unknown signals are produced to corrupt the compacted test responses kept in the MISR.

The proposed low-power test compression technique for LOC delay testing is different from the one in. First, the DFT architecture as presented in FIG. 4 is quite different from the one in. The low-power test application scheme is also different from the one in. Each test cycle contains a number of shift cycles followed by a launch cycle and a capture cycle. The number of shift cycles in a test cycle is equal to the maximum depth of scan trees.

Figure 5:
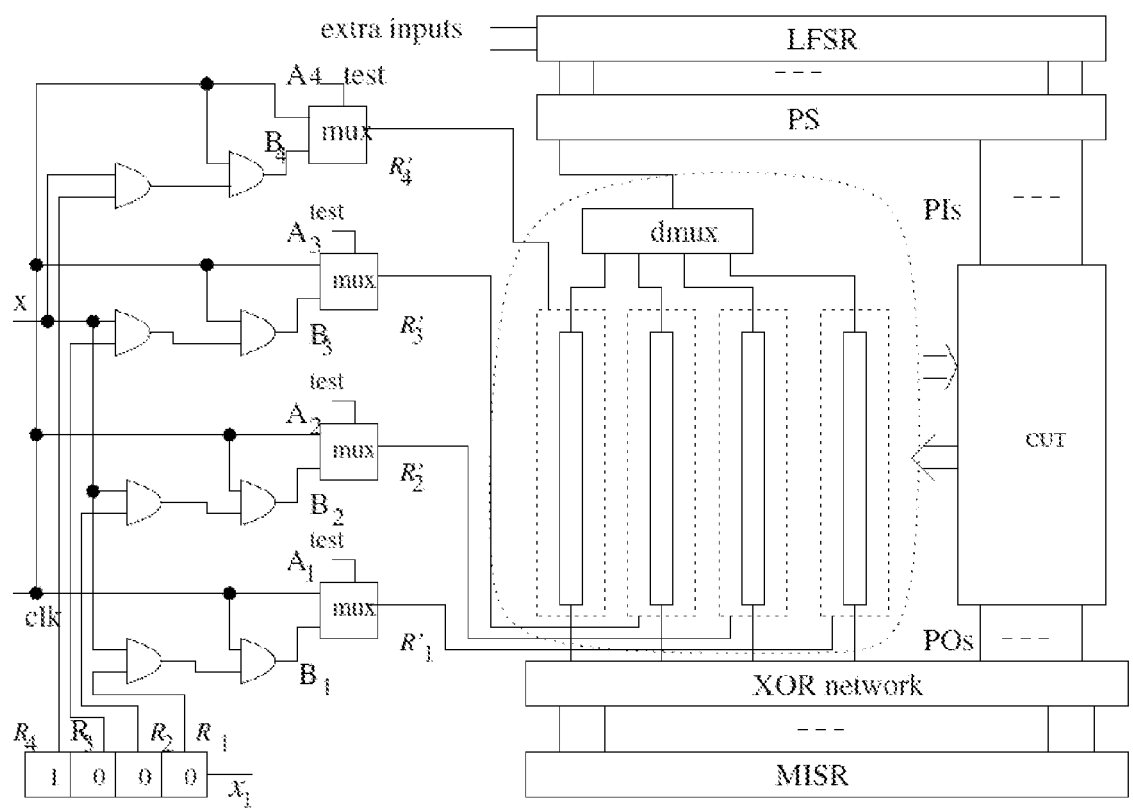
FIG. 5 is the DFT architecture for circuit s953.

The proposed DFT architecture as shown in FIG. 4, the gating technique and the low-power test application scheme can be of help to improve encoding capability. Experimental results confirm this. The amount of test data to be stored on-chip (or in the automatic test equipment, ATE) is also apparently reduced. The new DFT architecture can also be used for scan chain designed circuits instead of scan tree designed one when the scan trees cannot be established or designers who do not want to use scan trees. We consider circuit s953 as an example. As shown in FIG. 5, only a single scan-in pin is used, and the fanout factor of the demultiplexer is four.

2. Low-Power Test Compression for LOC Delay Testing

Our method loads a seed to the LFSR for deterministic built-in self-test. As shown in FIG. 4, the demultiplexers and gating logic are used not only for power consumption reduction, but also for encoding capability improvement. The fanout factor of the demultiplexers (dmux) for all scan-in pins are set to the same value. The parameter dmux is equal to k. We show that it has impact on encoding capability of the LFSR. The test application cost does not increase when the parameter dmux increases. The maximum depth of scan trees is also reduced simultaneously when dmux increases.

Each output of a demultiplexer drives a scan-tree instead of a scan chain. As shown in FIG. 4, there are k clock signals. Each of the clock signals drives a scan tree that fans out from each demultiplexer. For example, the clock signal $R_1'$ drives all the first scan trees loaded by all scan-in pins, while the clock signal $R_k'$ drives the kth scan trees.

There is no fault coverage loss introduced by the gating technique because the same test pair is applied to the whole circuit. Therefore, the dmux parameter can be set large enough. The parameter has impact on test power reduction. However, this parameter can be set large for the low-power test compression scheme, which has impact on the test data compression ratio. The same set of values for the extra variables are injected into the LFSR for each subset of scan trees driven by the same clock signal. Therefore, the compressed test data for each test pair is equal to the summation of the total number of injected extra variables (e.d', d'≤d, d is the maximum depth of the scan trees) and the size of the LFSR.

A seed is loaded into the LFSR for the first subset of scan trees. The test data are loaded to the first subset of scan trees when the extra variables are injected into the LFSR. After the test data have been delivered into the first subset of scan trees, the test data based on the successive state of the LFSR are loaded into the second subset of scan trees when the same values on the extra variables are injected to the LFSR. This process continues until all scan trees are loaded the test data.

Each pin from the gating logic drives a group of scan trees that will be activated simultaneously. An effective seed encoding scheme is used here to reduce the storage requirements of the deterministic test pairs for LOC transition fault testing. The encoded seed is shifted into the LFSR first. A deterministic test pair is shifted into the scan trees that are activated by the gating logic, where each scan-in signal drives a number of scan trees, and only one of the scan trees driven by the scan-in signal is activated. The extra variables are injected into the LFSR when the seed is shifted into the activated scan trees. The gating logic as shown in FIG. 4 partitions scan trees into multiple groups.

The first group of scan trees is disabled after they have received the test data. The second group of scan trees is activated simultaneously, and all other scan trees are disabled. The following scan shift cycles start from the LFSR state when all deterministic test data are shifted into the first group of scan trees. The scan shift operations are repeated when the same extra variables are injected into the LFSR. This process continues until all scan trees have received their test data.

Our method activates all scan flip-flops in the launch cycle when applying the test data to the primary inputs (PIs). A capture cycle for all scan flip-flops follows when the test data are applied to the PIs. The new technique can only reduce shift power instead of test power in the launch and capture cycles. Test power in the launch and capture cycles can be reduced by using a low-power test generator, which is not discussed in this invention.

The scan outputs of all scan chains, that are driven by the same clock signal, are connected to the same XOR network to compact test responses during the low-power test application phase. As shown in FIG. 4, the output of all shorter scan chains are connected to the XOR network, and the outputs of the XOR network are connected to the MISR. The test responses of the previous test pair captured in the scan flip-flops are shifted out in only a few clock cycles when shifting in the next test pair.

We first consider the situation when dmux=1. That is, no gating technique is used. Let L, i, v, and S be the size of the LFSR, the number of consecutive cycles to inject the extra variables, the number of extra variables, and the number of care bits, respectively. Assume that the number of care bits for all scan chains at level k is $b_k$, and the total number of injected extra variables after j shift cycles is $V_j$. The necessary conditions to encode all deterministic test pairs can be stated as follows: (a) $L+i\cdot v \geq S$, and (b) $\Sigma_{k=d-1}^{k-d-1-j} b_k \leq (L+V_j)$.

The summation of the size of the LFSR and the total number of extra variables injected into the LFSR must be at least the maximum number of care bits of the deterministic test pairs. Therefore, the condition $L+i\cdot v \geq S$ must be satisfied. At any clock cycle, the summation of the size of LFSR and the whole 6number of injected extra variables must be greater than the total care bits in the scan flip-flops that have been shifted test data in the process of test application. The condition $\Sigma_{k=d-1}^{k-d-1-j} b_k \leq (L+V_j)$ must be satisfied in order for the linear equations to be solvable.

Let us consider the situation when dmux>1. That is, the gating logic as shown in FIG. 4 is used. Assume that the number of care bits for all scan flip-flops at level k is $b_{j,k}$ for the jth subset of scan chains, and the total number of injected extra variables after j shift cycles is $V_{j,i}$ for the jth subset of scan chains.

The necessary conditions to encode the care bits in the first group of scan chains for all deterministic test pairs can be stated as follows: (a) $L+h\cdot v \geq S$ (v extra variables are injected into the LFSR for the first h clock cycles), and (b) $\Sigma_{k=d-1}^{k-d-1-j} b_{j,k} \leq (L+V_j)$.

The necessary conditions to encode the care bits after the first group of scan chains for all deterministic test pairs can be stated as follows: (a) $L+h\cdot v \geq S$, and (b$\Sigma_{k=d-1}^{k-d-1-j} b_{j,k} \leq (L+V_j)$, where $v\cdot h$ is the total number of extra variables injected into the LFSR, and extra variables are injected into the LFSR in the first h clock cycles. At any clock cycle, the summation of the size of LFSR and the total number of injected extra variables must be greater than the total care bits in the scan flip-flops that have received test data in the process of test application.

When dmux (the fanout factor of the demultiplexers), as shown in FIG. 4, increases, the test application time does not increase. The reason is that depth of the scan trees also decreases when dmux increases. However, test data volume can be compressed better when dmux increases. The experimental results presented later confirm this.

Why test data can be compressed better when dmux increases? The reason can be as follows: (1) it can be easier to find solution for the linear equations when partitioning the scan trees into more subsets. The number of equations to be satisfied can be fewer before enough extra variables have been inserted. Therefore, the number of extra pins, that must be injected into the LFSR, can be fewer. (2) The total number of extra variables can be fewer if the number of injected extra pins to the LFSR remains the same because depth of scan trees decreases.

Test data volume corresponding to a test pair includes two portions: (1) the seed, and (2) the total number of extra variables. In this invention, the total number of extra variables T is $T=v\cdot h$, where v and h are the number of extra pins injected into the LFSR and number of cycles with v extra variables injected into the LFSR.

Our method provides zero-aliasing test response compaction. All scan output signals of the scan chains driven by the same clock signal are connected to the same XOR tree. Two scan chains $(c_{1,1}, c_{1,2}, \ldots, c_{1,l})$ and $(c_{2,1}, c_{2,2}, \ldots, c_{2,1})$ are compatible if $c_{1,1}$ and $c_{2,1}$, $c_{2,1}$ and $c_{2,2}$, $\ldots$, $c_{1,l}$ and $c_{2,l}$ do not have any common combinational predecessor in the two-frame circuit, respectively. The scan forest architecture and the proposed DFT architecture make the scan chain much shorter, which improve the performance of the test response compactor.

The outputs of the XOR network are connected to the MISR. Test responses of all deterministic test pairs and pseudo-random patterns can be compacted into a couple of bits. Unknown-tolerant techniques can be proposed to mask unknown responses if necessary.

3. Static Test Compaction by Bitwise Modifying the Encoded Seeds

We propose a new static test compaction procedure after all seeds have been produced by bitwise modifying the seeds and the extra variables. The seeds are ordered according to summation of the number of seed bits and the number of extra variable bits. We consider the compact test set for LOC transition fault testing after dynamic and static test compaction have been completed. The following static test compaction can further reduce test data volume after all seeds have been produced although we has used an effective and very fast static test compaction scheme on the baseline test set.

Our method produces a seed with a sequence of extra variables. Our method can always find a seed with a sequence of extra variables to encode any test pair in the compact test set according to the new primitive polynomial selection scheme. In the process of the compact test pattern generation, each test pair covers a number of faults. Assume that each seed s keeps a fault list Fs. The proposed method orders all seeds according to the summation of the numbers of bits in the seed, and the total number of bits of the extra variable to encode the test pair. That is, the seed with the most bits is proceeded first.

A seed with the most bits is taken first, our method do fault simulation on the modified seed on each bit of the seed and the extra variables by complementing the bit. Our method remains the modification on the seed s if the modified seed covers all detected faults in $F_s$ of the corresponding test pair, and detect at least one more fault covered by any seed later in the ordered seed sequence. Otherwise, our method recovers the seed back to the original. When complementing a bit of the seed or the extra variables of s makes the test pair detect any fault f covered by another seed s' later in the ordered sequence, the fault f is moved to the detected fault list $F_s$ of seed s. This fault is also removed from the detected fault list $F_{s'}$ of seed s'.

When the detected fault list Fs of s increases, it is more difficult to cover faults detected by other seeds because complementing any bit of the seed s must remain to detect all faults in Fs. When the detected fault list $F_{s'}$ of s' becomes empty, s' is deleted from the seed sequence. It can still be very helpful although s' is not removed from the seed sequence. That is, the detected fault list $F_{s'}$ of s' is not empty finally when processing the seed s'. However, this can also remain more flexibility when handling seed s' with the less detected fault list. The process may be timing-consuming. The proposed DFT architecture significantly reduces the number of care bits (tens of times) compared to the designs with scan chains, therefore, the CPU time to handle this can be significantly reduced.

4. Test Point Insertion to Reduce Test Data Volume

Figure 2:
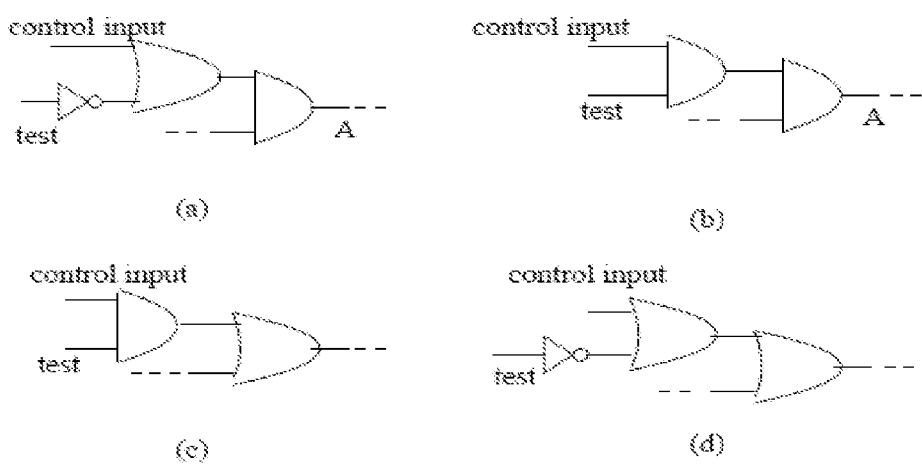
FIGS. 2a-2d is the proposed test point architecture.

We propose a new test point architecture and a new test point insertion approach for LOC delay testing. In all cases, the control input of a control point is connected to an PPI. The new test point architecture in this invention is presented as shown in FIG. 2:

(1) FIGS. 2(a) and 2(b) present the 0-control test points, one is constructed using an OR gate in FIG. 2(a) and the other an AND gate as the switching gate. Both switching gates are connected to the AND gate. The test mode link is connected to the AND switching gate in FIG. 2(b), and it is connected to an inverter first and the output of the inverter is connected to the other input of the switching OR gate as shown in FIG. 2(a).

(2) FIGS. 2(c) and 2(d) present the 1-control test points, one is constructed using an AND gate in FIG. 2(c) and the other an OR gate as the switching gate. Both switching gates are connected to the OR gate. The test mode link is connected to the AND switching gate in FIG. 2(c), and it is connected to an inverter first and the output of the inverter is connected to the other input of the switching OR gate as shown in FIG. 2(d).

Timing-driven test point insertion placed test points away from the critical paths to improve random testability. Test point insertion can be a good way to reduce test data volume. However, those methods were proposed for single stuck-at fault testing, which cannot be directly applied to LOC delay testing. Control test points are inserted away from the critical paths. The influence input measure indicates the subset of inputs that must be specified in order to generate a test pair to detect a transition fault. The influence input measure was first proposed for single stuck-at fault testing, which was extended to test generation for transition faults. Our method uses the following gain function to select test points, $$G = \sum_{t \in F} \Delta |det(t)|, \quad (1)$$

where F is the 20% hard-to-detect transition faults among all uncovered ones, t can be a falling or rising transition fault. Assume that a line l in the first frame, the corresponding line is l' in the second frame of the two-frame circuit model. The detectability of a rising and falling transition at a single line is defined as the number of inputs must be specified to detect the transition fault in the two-frame circuit, $$\Delta|det(l/r)| = \Delta|C_0(l) \cup C_1(l') \cup O(l')|, \quad (2)$$

$$\Delta|det(l/f)| = \Delta|C_1(l) \cup C_0(l') \cup O(l')|. \quad (3)$$

where $C_1(l)$, $C_0(l)$, and $O(l)$ represent the subsets of PIs or PPIs in the first frame of the two-frame circuit model that must be specified in order to control value 1, 0 on the line.

Our method selects the 20% most hard-to-detect faults as the candidates to insert test points. 1-control or 0-control test points are tried to insert into all candidates. Our method selectively updates controllability measures of all nodes with changed measures using a selective tracing scheme. Similarly, our method estimates observability measure changes of the corresponding nodes. The location and type of control point is determined, which introduces the most detectability changes. Continue the above process until all test points have been inserted. All control points and observation points are inserted into both frames of the two-frame circuit when updating the input influence measures.

Our method inserts three different types of test points, 1-control, 0-control, and observation points. Extra pins must be well-controlled. All observation points are connected to the response compactors by considering the observation points like scan flip-flops. Two observation points can be connected to the same XOR gate if they do not have any common predecessor in the two-frame circuit. Assume that $O_1, O_2, \ldots, O_k$ are inserted into observation points, they can be connected to the same XOR tree with a single output if any pair of $O_1, O_2, \ldots, O_k$ do not have any common predecessor in the two-frame circuit.

The extra pins of the control points are connected to the PPIs in both frames of the two-frame circuit model. The extra pin of a control point can be connected to a PPI if the PPI and the node inserted into a control point do not have any common successor in the two-frame circuit. The two extra pins of two control points inserted into A and B can be connected to the same PPI in if any pair of A, B, and in do not have any common successor in the two-frame circuit.

Figure 3:
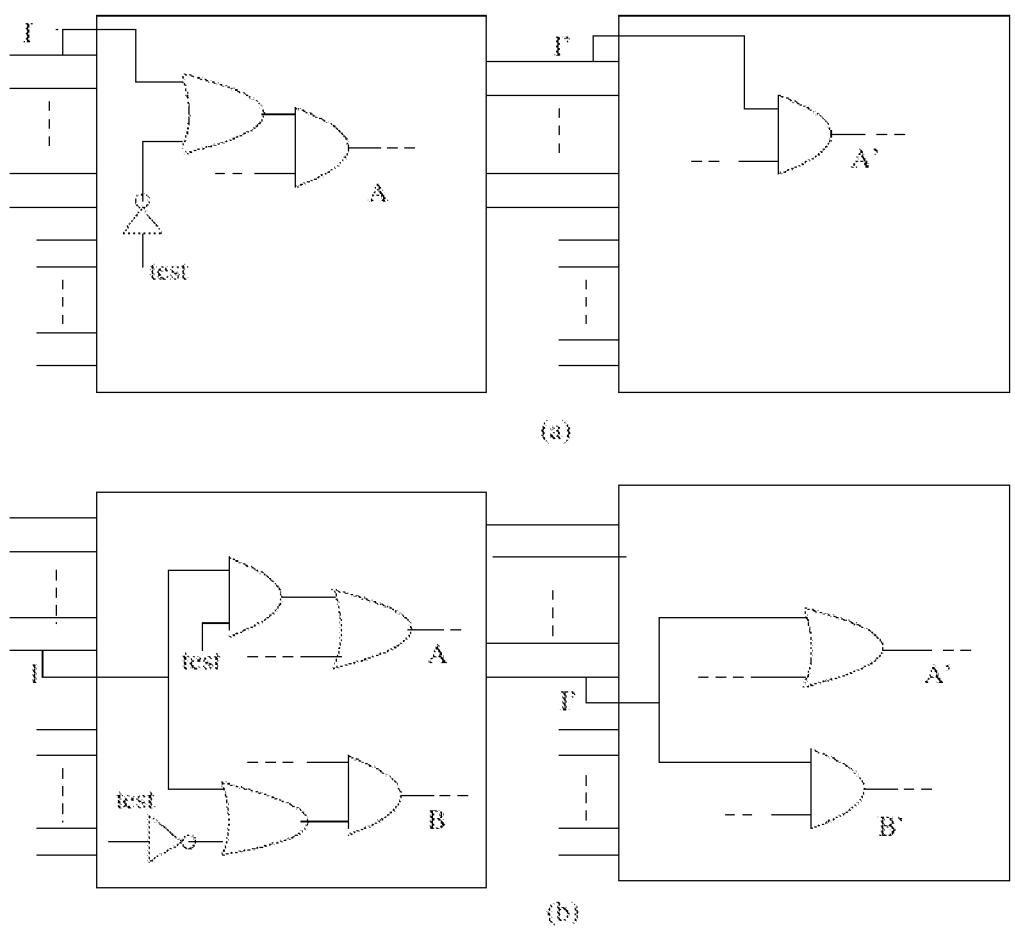
FIGS. 3a-3b is test point insertion to reduce test data volume.

As shown in FIG. 3(a), the extra pin of the test point at A (it is A' in the second frame) is connected to PPI I. It is required that I and A not have any common combinational successor in the two-frame circuit. As shown in FIG. 3(b), two test points inserted at A and B. Their extra pins are connected to the same PPI I. It is required that any pair of A, B, and I not have any common combinational successor in the two-frame circuit.

When we considering inserting a control test point to improve the test data compression rate, it is a little complex. A control point can be helpful to improve controllability of hard-to-detect faults because the first value of a falling or rising transition should be generated in the first frame of the circuit. A control point insertion can also improve controllability and observability of nodes in the second frame. In both cases, detectability of hard-to-detect faults can be improved. Therefore, we must attach the extra pin of a control point to a PPI. How to select a PPI to connect the extra pin of a control point? Our method selects one of the PPIs that is not converge with node A in the two-frame circuit, which have the best controllability after the control point in first frame has been inserted.

Observation point insertion is easier. Observability in only the second circuit frame is of interest to improve detectability of hard-to-detect transition faults. Therefore, we only consider observability improvement of nodes in the second frame of the circuit. Observability improvement for nodes in the first frame does not have any impact on detectability of any fault for LOC testing.

The new test point insertion scheme is to directly reduce the number of specified inputs for all hard-to-detect transition faults, which can have great impact on the compactness of the compact ATPG tool. Therefore, it can effectively reduce the test data volume of the hard-to-detect faults.

5. Experimental Results

TABLE II

Performance of the proposed test compression scheme for test sets of LOC transition fault testing

| | | | delay test compression with scan chain | | | | | Dcompress | |
|---|---|---|---|---|---|---|---|---|---|
| circuit | FC | vec | Org. | MAX | CTD(bit) | CPU (s) | faults | FC | vec |
| s38417 | 99.65 | 179 | 302868 | 681 | 90243 | 2068 | 47493 | 99.69 | 220 |
| b19 | 84.47 | 920 | 65695800 | 4053 | 4770829 | 11246 | 510382 | 84.48 | 10897 |
| wb_conmax | 99.05 | 1250 | 3785000 | 466 | 496591 | 1872 | 225226 | 99.05 | 1610 |
| usb_funct | 98.51 | 480 | 894720 | 683 | 127239 | 2136 | 67958 | 98.52 | 890 |
| pci_bridge | 97.65 | 862 | 3171298 | 1004 | 307992 | 4028 | 136249 | 97.67 | 1002 |
| des_perf | 99.88 | 248 | 2284576 | 4878 | 1370773 | 6856 | 452598 | 99.89 | 432 |
| ethernet | 99.39 | 3710 | 39852820 | 2159 | 3499300 | 7616 | 456836 | 99.39 | 3720 |
| vga_lcd | 99.64 | 8142 | 140473926 | 6032 | 9143327 | 14110 | 740895 | 99.65 | 8910 |
| netcard | 97.52 | 27810 | 2720541060 | 9609 | 137019952 | 35220 | 2905064 | 97.67 | 29670 |

| | Dcompress | | | | | | | |
|---|---|---|---|---|---|---|---|---|
| circuit | Org. | MAX | CTD (bit) | CR (times) | CPU (s) | dmax | faults | SI |
| s38417 | 63737 | 100 | 12599 | 23.64 | 1961 | 2 | 47070 | 10 |
| b19 | 24649014 | 1472 | 1420508 | 46.30 | 10106 | 4 | 507842 | 20 |
| wb_conmax | 3812480 | 71 | 68958 | 54.89 | 1643 | 2 | 223554 | 10 |
| usb_funct | 395668 | 100 | 17730 | 50.46 | 1904 | 2 | 67397 | 20 |
| pci_bridge | 694608 | 118 | 33302 | 95.23 | 3625 | 2 | 135424 | 20 |
| des_perf | 238353 | 49 | 13142 | 173.84 | 6029 | 2 | 448459 | 10 |
| ethernet | 39960240 | 2138 | 2785870 | 14.31 | 7489 | 32 | 455925 | 30 |
| vga_lcd | 10501745 | 364 | 454385 | 307.36 | 14057 | 8 | 737880 | 20 |
| netcard | 145970466 | 494 | 5419312 | 502.01 | 34897 | 32 | 2887738 | 30 |

Table II shows the performance of the proposed low-power test compression scheme, called Dcompress. The column delay test compression with scan chains presents the performance the test compression for the scan chain based designs, which is similar to EDT, but combined with the proposed primitive polynomial selection procedure. Therefore, the test compression for scan chain based designs does not cause pattern count increase. The columns FC, vec, MAX and CDT(bit) show the fault coverage, the number of test pairs, the maximum care bit of the test set, and the number of bits for the compressed test data to encode all deterministic test pairs, respectively. Columns CPU(s), faults, and Org. show the CPU time (seconds) to generate the compact test pair set, the number of transition faults, and the original test data volume (bits), respectively. The column Org. in Table II presents the baseline test data volume produced by the compact test generator.

It is found from the experimental results in Table II that the maximum care bits for scan forest design circuits is far less than that of the scan chain designed circuits. That is, the scan forest can compress test data significantly. The maximum care bit reduction time is closely related to the group size of the scan forest for all circuits. Both the scan-chain based and scan forest based methods use the same number of scan-in pins. The column dmux presents the fanout factor of the demultiplexers for the new method. The number of test pairs increases slightly for all circuits using the new method because it uses the scan forest architecture. The maximum care bit number is significantly reduced compared to the previous method, which also makes the test data volume of compressed tests significantly reduced.

TABLE III

Performance of the proposed test point insertion approach

| | Dcompress | | | | Dcompress + TPs | | | | | | | |
|---|---|---|---|---|---|---|---|---|---|---|---|---|
| circuit | FC | vec | MAX | CDT (bit) | FC | vec | MAX | CTD (bit) | rate (%) | CR (times) | dmux | SI |
| s38417 | 99.69 | 220 | 100 | 12599 | 99.69 | 210 | 108 | 12280 | 2.53 | 24.66 | 2 | 10 |
| b19 | 84.48 | 10897 | 1472 | 1420508 | 84.48 | 10362 | 1472 | 1349480 | 5.0 | 48.68 | 4 | 20 |
| wb_conmax | 99.05 | 1610 | 71 | 68958 | 99.26 | 1560 | 70 | 66892 | 3.0 | 56.58 | 2 | 10 |
| usb_funct | 98.52 | 890 | 100 | 17730 | 98.64 | 862 | 100 | 17377 | 1.99 | 51.49 | 2 | 20 |
| pci_bridge | 97.67 | 1002 | 118 | 33302 | 97.86 | 954 | 116 | 32305 | 2.99 | 98.17 | 2 | 20 |
| des_perf | 99.89 | 432 | 49 | 13142 | 99.89 | 418 | 49 | 12881 | 1.99 | 177.36 | 2 | 10 |
| ethernet | 99.39 | 3720 | 2138 | 2785870 | 99.58 | 3520 | 2138 | 2694420 | 3.28 | 14.79 | 32 | 30 |
| vga_lcd | 99.65 | 8910 | 364 | 454385 | 99.64 | 8470 | 368 | 431671 | 5.0 | 325.42 | 8 | 20 |
| netcard | 97.52 | 29670 | 494 | 5419312 | 97.50 | 28187 | 492 | 5182575 | 4.37 | 524.94 | 32 | 30 |

Table III shows the performance of test point insertion on the low-power test compression scheme. Column rate (%) presents the percentage of test data volume reduction. It is found that test point insertion compresses test data volume by 5% for circuits b19 and vga. Fault coverage for all circuits obtains trivial improvement by the proposed test point insertion scheme. In Table III, columns "Dcompress" and "Dcompress+TPs" show that test data volume for the proposed test compression scheme, and test data volume for the proposed test compression scheme with test points. It is found from Table III that the maximum number of care bits almost remains the same after inserting test points. However, the pattern count decreases slightly after inserting the test points. The column CR(times) shows the test compression ratio (test data reduction times) after test point insertion has been combined with the test compression scheme. The compression ratio increases for all circuits after inserting test points.

TABLE IV

Performance of the proposed static test compaction scheme

| | Dcompress | | | | | Static Compaction | | | | | | | | |
|---|---|---|---|---|---|---|---|---|---|---|---|---|---|---|
| circuit | FC | vec | MAX | CTD (bit) | CPU (s) | FC | vec | MAX | CTD (bit) | rate (%) | CPU (s) | CR (times) | dmux | SI |
| s38417 | 99.69 | 220 | 100 | 12599 | 1961 | 99.69 | 186 | 100 | 11573 | 8.14 | 4867 | 26.17 | 2 | 10 |
| b19 | 84.48 | 10897 | 1472 | 1420508 | 10106 | 84.48 | 10024 | 1472 | 1290026 | 9.19 | 27043 | 50.93 | 4 | 20 |
| wb_conmax | 99.05 | 1610 | 71 | 68958 | 1643 | 99.26 | 1483 | 71 | 60747 | 7.90 | 3307 | 62.31 | 2 | 10 |
| usb_funct | 98.52 | 890 | 100 | 17730 | 1904 | 98.64 | 828 | 100 | 16447 | 7.24 | 4032 | 54.40 | 2 | 20 |
| pci_bridge | 97.67 | 1002 | 118 | 33302 | 3625 | 97.86 | 926 | 118 | 30704 | 7.80 | 7362 | 103.29 | 2 | 20 |
| des_perf | 99.89 | 432 | 49 | 13142 | 6029 | 99.89 | 406 | 49 | 12343 | 6.08 | 13072 | 185.09 | 2 | 10 |
| ethernet | 99.39 | 3720 | 2138 | 2785870 | 7489 | 99.58 | 3350 | 2138 | 2517283 | 9.64 | 18380 | 15.83 | 32 | 30 |
| vga_lcd | 99.65 | 8910 | 364 | 454385 | 14057 | 99.64 | 8019 | 364 | 418234 | 7.96 | 35142 | 335.87 | 8 | 20 |
| netcard | 97.52 | 29670 | 494 | 5419312 | 34897 | 97.50 | 26851 | 494 | 4909896 | 9.40 | 88024 | 554.09 | 32 | 30 |

Table IV presents the performance comparison of the proposed static test compaction scheme after all test pairs have been encoded. The column "Static Compaction" shows the performance after the static compaction scheme has been implemented. The columns vec, MAX, CTD(bit), rate(%), CPU(s), and CR(times) stand for the reduced pattern count, the maximum number of care bits for the reduced seeds, reduction percentage for the test data volume, CPU time (seconds) for the static test compaction scheme, and the updated compression ratio (times). The number of maximum care bits remains the same for all circuits. Test data volume is reduced close to 10% for a couple of circuits. The pattern count also decreases apparently for almost all circuits. The static test compaction scheme obtains apparently better compression ratio for all other circuits after combined with the proposed low-power test compression scheme.

TABLE V

Performance of the proposed test compression scheme with static test compaction and test point insertion

| | Dcompress | | | | | | | Static Compaction + TPs Dcompress | |
|---|---|---|---|---|---|---|---|---|---|
| circuit | FC | vec | MAX | CTD (bit) | TA | TAR (times) | CPU (s) | FC | vec |
| s38417 | 99.69 | 220 | 100 | 12599 | 6160 | 4.82 | 1961 | 99.69 | 180 |
| b19 | 84.48 | 10897 | 1472 | 1420508 | 1242258 | 2.65 | 10106 | 84.50 | 9897 |
| wb_conmax | 99.05 | 1610 | 71 | 68958 | 22540 | 5.11 | 1643 | 99.26 | 1477 |
| usb_funct | 98.52 | 890 | 100 | 17730 | 12460 | 2.29 | 1904 | 98.54 | 822 |
| pci_bridge | 97.67 | 1002 | 118 | 33302 | 40080 | 3.27 | 3625 | 97.67 | 914 |
| des_perf | 99.89 | 432 | 49 | 13142 | 5184 | 41.96 | 6029 | 99.89 | 401 |
| ethernet | 99.39 | 3720 | 2138 | 2785870 | 1316880 | 0.997 | 7489 | 99.58 | 3292 |
| vga_lcd | 99.65 | 8910 | 364 | 444385 | 516780 | 13.49 | 14057 | 99.65 | 7964 |
| netcard | 97.52 | 29670 | 494 | 5419312 | 5755980 | 15.76 | 34897 | 97.50 | 26313 |

| | Static Compaction + TPs Dcompress | | | | | | | |
|---|---|---|---|---|---|---|---|---|
| circuit | MAX | CTD (bit) | TA | rate (%) | CPU (s) | CR (times) | TAR (times) | $TA_c$ (cycles) |
| s38417 | 100 | 11342 | 4680 | 9.97 | 4902 | 26.70 | 6.35 | 29714 |
| b19 | 1472 | 1276125 | 1187640 | 10.16 | 21286 | 51.48 | 2.77 | 3289700 |
| wb_conmax | 71 | 59806 | 20678 | 9.33 | 3728 | 63.29 | 4.78 | 98750 |

TABLE V-continued

Performance of the proposed test compression scheme with static test compaction and test point insertion

| | | | | | | | | |
|---|---|---|---|---|---|---|---|---|
| usb_funct | 100 | 16350 | 11508 | 7.78 | 4312 | 54.72 | 3.55 | 40800 |
| pci_bridge | 188 | 30219 | 36560 | 9.25 | 7720 | 104.94 | 4.01 | 146540 |
| des_perf | 49 | 12246 | 4812 | 6.82 | 13524 | 186.56 | 45.20 | 217496 |
| ethernet | 2138 | 2492110 | 1165368 | 10.54 | 18254 | 15.99 | 1.13 | 1313340 |
| vga_lcd | 364 | 413051 | 461912 | 9.09 | 35266 | 340.09 | 15.09 | 6969552 |
| netcard | 494 | 4892698 | 5104722 | 9.72 | 87242 | 556.06 | 17.77 | 90716220 |

Table V shows the performance of the combination of the static test compaction scheme and the test point insertion scheme. Column TA presents the test application cost (cycles) for the original test compression scheme and the combination of the new test compression scheme with static test compaction on the encoded seeds and test point insertion. Column TAR (times) presents the test application cost reduction (times) for the low-power test compression scheme and the test compression scheme with static test compaction on the encoded seeds and the test point insertion scheme. Column TAc shows test application cost for the multiple scan chain designed circuits. The column rate (%) gives percentage of the final test data reduction compared to the original test compression scheme.

TABLE VI

Impact of dmux and scan-in pins on test data volume

| SI | dmux = 1 | dmux = 2 | dmux = 4 | dmux = 8 | dmux = 16 | dmux = 32 |
|---|---|---|---|---|---|---|
| 10 | 7735396 | 7510096 | 6909296 | 6533796 | 6308496 | 6158296 |
| 15 | 7348631 | 7134596 | 6563836 | 6207111 | 5993076 | 5830386 |
| 20 | 7193925 | 6984396 | 6425652 | 6076437 | 5866908 | 5727222 |
| 25 | 6961866 | 6759096 | 6218376 | 5880426 | 5677656 | 5542476 |
| 30 | 6807160 | 6608896 | 6080192 | 5749752 | 5551487 | 5419312 |

Table VI presents the impact of the number of scan-in pins and the fanout factor dmux of the demultiplexers in the DFT architecture on the compression ratio. The number of scan-in pins changes from 10 to 30, and dmux changes from 1 to 32. It is shown from the experimental results in Table VI for the circuit netcard that the test data volume apparently reduces when the number of scan-in pins or dmux increases.

What is claimed is:

1. A design for testability (DFT) architecture configured to implement the low-power test compression method for LOC transition fault testing using a new deterministic built-in self-test scheme, wherein,
 the DFT architecture includes: (1) a linear-feedback shift-register (LFSR) established by the selected primitive polynomial and the selected number of extra variables injected to the LFSR; (2) a scan tree architecture for LOC transition fault testing; and (3) a new gating technique; selecting a primitive polynomial with the minimum number of stages and the smallest number of extra variables, which encodes all deterministic tests;
 wherein each demultiplexer drives the same number of scan trees, wherein each scan tree is driven by a separate clock signal; the signal $R'1$ drives all the first scan trees from all demultiplexers, the signal $R'2$ drives all the second scan trees from all demultiplexers, . . . , and $R'k$ drives all the kth scan trees from all demultiplexers; increasing the fanout factor of the demultiplexers does not increase test application cost because the depth of the scan trees decreases;
 wherein each stage of the phase shifter (PS) drives multiple scan trees as shown in FIG. 1, which also significantly reduces the size of the PS compared with the multiple scan-chain architecture; each stage of the PS in multiple scan-chain design drives a single scan chain; if the fanout factor of the demultiplexers is 16, and the group size for the scan trees is 10; each scan-in pin drives 160 scan chains; the compactor connected to the combinational part circuit under test (CUT) of the circuit is to reduce the size of the multiple-input signature analysis register (MISR),
 wherein the scan trees are constructed by circuit structural analysis; each output of a demultiplexer drives a scan tree, where all scan flip-flops at the same level of a scan tree do not have any common combinational successor in the two-frame circuit; more scan chains are connected to the same XOR to compact test responses if the scan flip-flops at the same level of the scan chains do not have any common predecessor in the two-frame circuit.

* * * * *